United States Patent [19]

Kizu et al.

[11] 4,269,043
[45] May 26, 1981

[54] COUPLING FOR RESILIENTLY CONNECTING TWO SHAFTS FOR TRANSMISSION OF TORQUE

[75] Inventors: Ryohei Kizu; Taketo Matoba; Yasuo Oguni; Hideaki Sakurai, all of Toyota, Japan

[73] Assignee: Toyota Jidosha Kogyo Kabushiki Kaisha, Toyota, Japan

[21] Appl. No.: 56,415

[22] Filed: Jul. 10, 1979

[30] Foreign Application Priority Data

Feb. 24, 1979 [JP] Japan .............................. 54-23398[U]

[51] Int. Cl.³ .............................................. F16D 3/68
[52] U.S. Cl. ....................................... 64/11 R; 64/23; 64/27 NM; 74/492
[58] Field of Search .................... 64/1 V, 8, 11 R, 23, 64/23.5, 23.6; 74/492

[56] References Cited

U.S. PATENT DOCUMENTS

| | | | |
|---|---|---|---|
| 1,891,915 | 12/1932 | Clark | 64/11 R |
| 1,921,910 | 8/1933 | Clark | 64/11 R |
| 2,729,442 | 1/1956 | Neidhart | 64/27 NM X |
| 2,948,129 | 8/1960 | Troyer | 64/11 R |
| 3,482,464 | 12/1969 | Reich et al. | 64/27 NM |
| 3,808,838 | 5/1974 | Bowen et al. | 64/27 NM |
| 4,020,651 | 5/1977 | Callies | 64/23 |
| 4,045,980 | 9/1977 | Woodward et al. | 64/23 |

Primary Examiner—Allan D. Herrmann
Attorney, Agent, or Firm—Oblon, Fisher, Spivak, McClelland & Maier

[57] ABSTRACT

A coupling interposed between a driving shaft and a driven shaft for transmitting torque from the driving shaft to the driven shaft. The coupling comprises a tube which is non-circular in cross section, a solid body inserted in the tube to create a clearance having a certain width between the inner periphery of the tube and the outer periphery of the solid body and a plurality of impact absorbing members made of elastic material such as rubber and fixed to certain portions of the outer periphery of the solid body. The impact absorbing members are positioned so as to prevent contact of the inner periphery of the tube and the outer periphery of the solid body when torque transmitted from the driving shaft is under a predetermined level and permit contact of the inner periphery of the tube and the outer periphery of the solid body when the torque is at or over the predetermined level. Therefore, when the torque is under the predetermined level, vibration transmitted from the driven shaft is absorbed or damped by the impact absorbing members and when the torque is at or over the predetermined level, it is directly transmitted to the driven shaft.

7 Claims, 10 Drawing Figures

COUPLING FOR RESILIENTLY CONNECTING TWO SHAFTS FOR TRANSMISSION OF TORQUE

BACKGROUND OF THE INVENTION

1. Field of the Invention

The present invention relates to a coupling to be interposed between a driving shaft and a driven shaft, for example, a steering main shaft and a steering gear shaft in the steering system of an automobile. In particular, it relates to a coupling for transmitting torque from a driving shaft to a driven shaft through impact absorbing members of elastic material such as rubber in the small torque range and by direct contact of a member connected with the driving shaft and a member connected with the driven shaft in the large torque range and thereby absorbing or damping impacts such as vibration, a shock and a noise transmitted from the driven shaft.

2. Description of the Prior Art

Various kinds of such a coupling, i.e., a coupling having variable torsional rigidity, have heretofore been provided and put into practice for the steering system of an automobile. In the steering system of an automobile, as is well known, impacts such as vibration and a shock caused by movement of the wheels or the steering gear are transmitted through the steering main shaft to the driver holding the steering wheel and give an uncomfortable feeling to the driver. However, when the aforementioned coupling having torsional rigidity is interposed between the steering main shaft and the steering gear shaft, the impacts are effectively absorbed or damped by the coupling to give a comfortable ride feeling to the driver. In the steering system, further, a high level of rigidity is required to make the steering wheel be sharply turned. Thus, it is conditioned in the steering system of an automobile that impacts transmitted from the wheel or steering gear are effectively absorbed or damped and that the steering wheel can sharply be turned.

The various couplings heretofore provided to fulfil the aforementioned requirements are all complicated in construction and costly to produce.

SUMMARY OF THE INVENTION

An object of the present invention is to provide a coupling for resiliently connecting two shafts, which is effective in absorbing or damping impacts such as vibration, a shock and a noise and operates reliably and durably in a wide range of torque to be transmitted from one shaft to the other.

Anoter object of the present invention is to provide a coupling for resiliently connecting two shafts, which is simple in construction, inexpensive to produce and easy to mount between the shafts to be connected.

The coupling according to the present invention comprises a tubular member having an inner peripheral surface and which is non-circular in cross section, a solid member received in the tubular member and having an outer peripheral surface spaced from the inner peripheral surface of the tubular member and a plurality of impact absorbing members made of elastic material such as rubber and fixed to the outer peripheral surface of the solid member. The impact absorbing members are so dimensioned and positioned as to prevent contact of the inner peripheral surface of the tubular member and the outer peripheral surface of the solid member when relative torque working therebetween is under a certain level and permit contact of the inner peripheral surface of the tubular member and the outer peripheral surface of the solid member when the torque is at or over the level.

DESCRIPTION OF THE PREFERRED EMBODIMENTS

Figure 1:
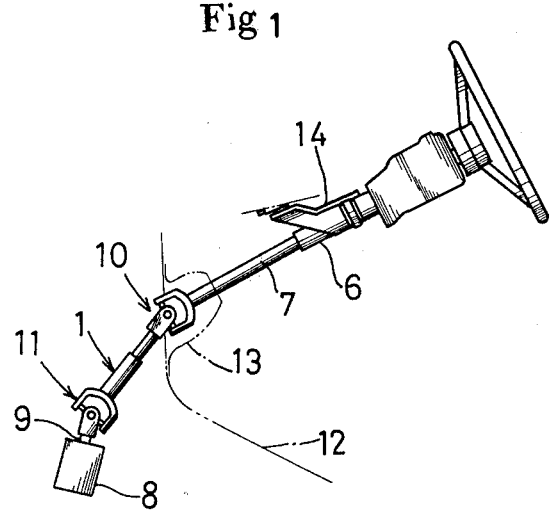
FIG. 1 is a diagrammatical illustration of the steering system of an automobile in which a coupling of the present invention is applied.
Figure 2:
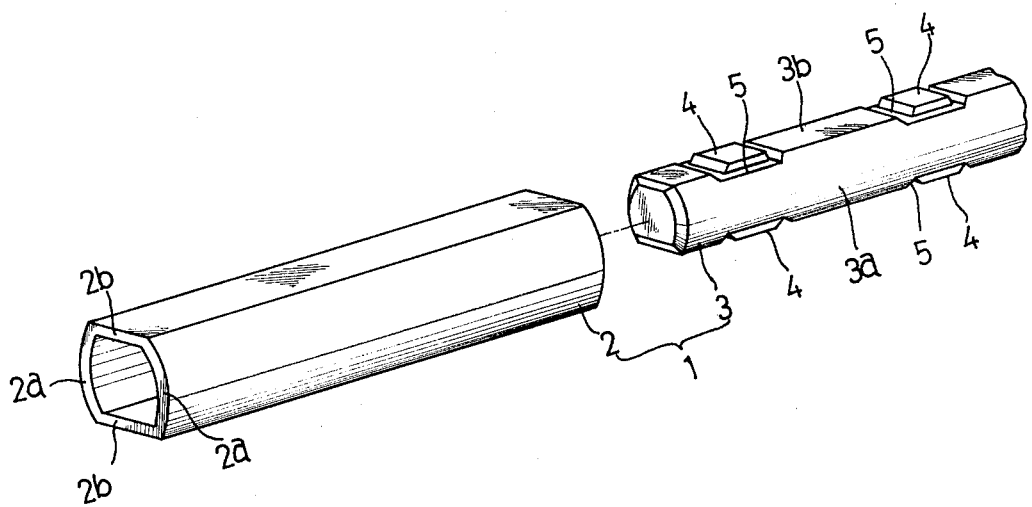
FIG. 2 is an exploded perspective view of a coupling embodying the present invention.
Figure 3:
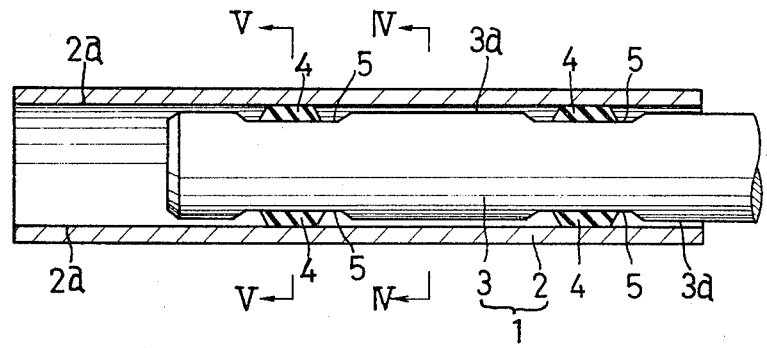
FIG. 3 is a longitudinally cross-sectional view of the coupling of FIG. 2.
Figure 4:
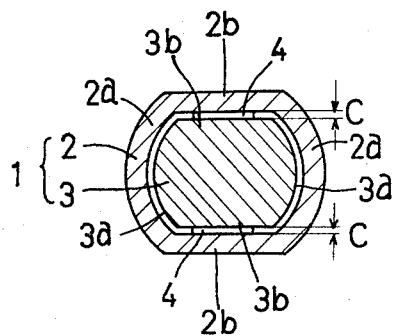
FIG. 4 is a cross-sectional view taken along the lines IV—IV of FIG. 3.
Figure 5:
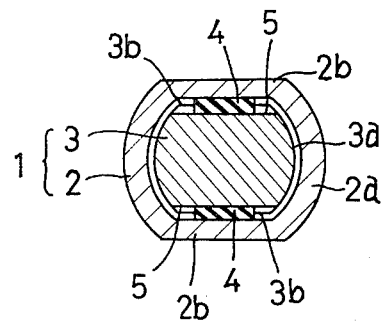
FIG. 5 is a cross-sectional view taken along the lines V—V of FIG. 3.

Referring now to FIG. 1 of the drawings, there is shown a coupling 1 which is applied to the steering system of an automobile. The coupling 1 is interposed between a steering main shaft 7 extending straightly from a steering column 6 and a steering gear shaft 9 placed in a steering gear case 8, and the both ends of the coupling 1 are connected with the forward end of the steering main shaft 7 and the upper end of the steering gear shaft 9 by a pair of universal joints 10 and 11 respectively. The universal joints 10 and 11 may be omitted when the steering main shaft 7 and the steering gear shaft 9 are linearly aligned with each other. In this case, the ends of the coupling 1 are connected with the steering main shaft 7 and the steering gear shaft 9 directly or by coupling or by spline coupling. Numeral 12 indicates a dashboard having a column hole cover 13 for covering the forward end of the steering main shaft 7, and numeral 14 indicates a bracket for the steering column 6.

As shown in FIGS. 2 to 5, the coupling 1 comprises a hollow tubular member 2 connected with the steering gear shaft 9 by the universal joint 11, a solid member 3 inserted into the tubular member 2 and extending outwardly therefrom to be connected with the steering main shaft 7 by the universal joint 10 and a plurality of impact absorbing members 4 interposed between the tubular member 2 and the solid member 3. The impact absorbing members 4 are made of elastic material such as rubber while the tubular member 2 and the solid member 3 are made of rigid material such as metal for facilitating transmission of torque from the steering main shaft 7 to the steering gear shaft 9. The tubular member 2 comprises a pair of longitudinally symmetrical arcuate walls 2a and a pair of longitudinally parallel plane walls 2b and is barrel-shaped in cross section, and the solid member 3 has a pair of longitudinally symmetrical arcuate surfaces 3a and a pair of longitudinally parallel plane surfaces 3b and is barrel-shaped in cross section. The tubular member 2 and the solid member 3 are so sized relative to each other as to create a small clearance C of, for example, 0.3 mm to 0.5 mm between the inner periphery of the tubular member 2 and the outer periphery of the solid member 3.

The solid member 3 is provided in its plane surfaces 3b with two longitudinally spaced apart pairs of transversely opposite concavities 5 each receiving one impact absorbing member 4 for absorbing or damping vibration. Each impact absorbing member 4, which is rectangular-shaped, is fixed to each concavity 5 by a bonding agent or by means of vulcanization previous to insertion of the solid member 3 into the tubular member 2. The impact absorbing members 4 are thus interposed between the tubular member 2 and the solid member 3 when the solid member 3 is inserted into the tubular member 2. In this condition, the impact absorbing members 4 are compressed in the diametrical direction of the tubular member 2 against the inner surfaces of the plane walls 2b.

With the coupling 1 thus constructed, transmission of torque from the steering main shaft 7 to the steering gear shaft 9 is carried out between the solid member 3 and the tubular member 2 through the impact absorbing members 4 in the small torque range and by direct contact of the solid member 3 and the tubular member 2 in the large torque range. When the level of torque working on the solid member 3 through the steering main shaft 7 is low, the torque is transmitted via the tubular member 2 to the steering gear shaft 9 through elastic deformation of the impact absorbing members 4. On the other hand, when the torque working on the steering main shaft 7 is increased at or over a certain level, the plane surfaces 3b of the solid member 3 torsionally contact the inner surfaces of the plane walls 2b of the tubular member 2 upon deflection of the impact absorbing members 4 corresponding to the width of the clearance C, and the torque is transmitted to the steering gear shaft 9 by direct contact of the tubular member 2 and the solid member 3.

Figure 6:
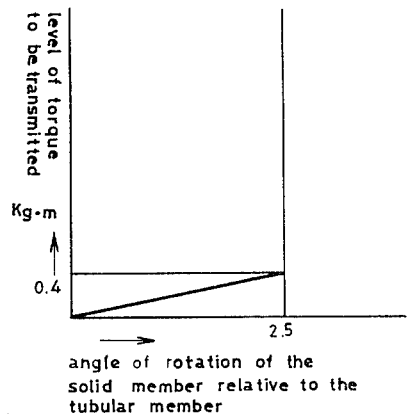
FIG. 6 is a graph showing the relation between the level of torque to be transmitted and the angle of rotation of the solid member relative to the tubular member.

FIG. 6 is a graph showing the relation between the level of torque to be transmitted and the angular displacement of the solid member 3 relative to the tubular member 2. As is clearly seen from FIG. 6, the angle of relative rotation of the solid member 3, i.e., angle of torsion between the solid member 3 and the tubular member 2 makes a large change in the small torque range in which the torque is transmitted through the impact absorbing members 4 and a small change in the large torque range in which the torque is transmitted by direct contact of the tubular member 2 and the solid member 3. Namely, the coupling 1 changes its torsional rigidity in proportion to the level of torque to be transmitted from the steering main shaft 7 to the steering gear shaft 9. In FIG. 6, the angle of torsion between the solid member 3 and the tubular member 2 by deflection of the impact absorbing member 4 is indicated at about 2.5° while the level of the torque is about 0.4 Kg-m.

In the steering system of an automobile, the steering main shaft 7 is generally kept unloaded or subjected to relatively small torque. In the small torque range, impacts such as vibration, a shock or a noise generated in the wheels or the steering gear to be transmitted to the steering main shaft 7 are effectively absorbed or damped by the impact absorbing members 4 to give a good ride feeling to the driver. On the other hand, the steering wheel can sharply be turned in the large torque range since the torque is transmitted by direct contact of the tubular member 2 and the solid member 3 both having good rigidity.

Further, since the solid member 3 is supported with respect to the tubular member 2 by two pairs of impact absorbing members 4, the coupling 1 is effective in cushioning the bending moment working thereon to prevent the solid member 3 from contacting the tubular member 2 by the bending moment. The impact absorbing members 4 can easily be exchanged for new ones at need.

Though the coupling 1 is applied to the steering system in the aforementioned embodiment, it can be applied to any system which requires vibration damping between an input unit and an output unit.

Figure 7:
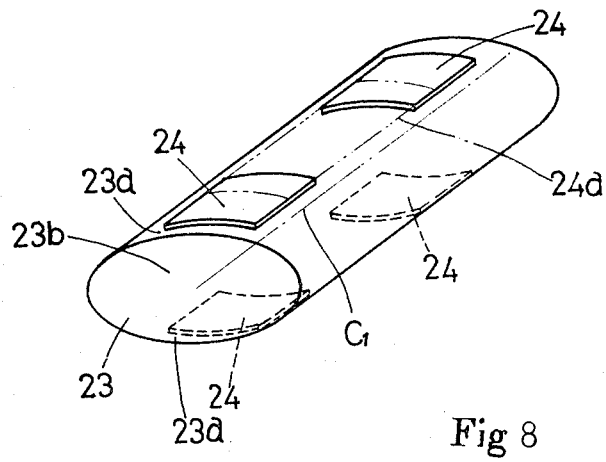
FIG. 7 is a perspective view showing a second embodiment of the coupling of the present invention.
Figure 8:
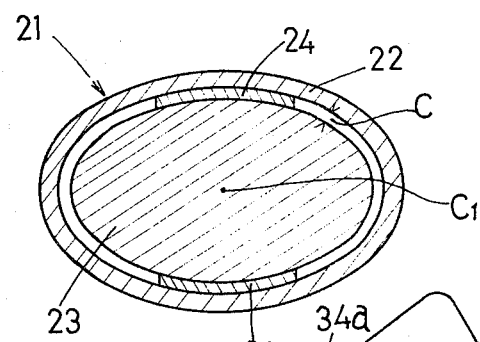
FIG. 8 is a cross sectional view of the coupling of FIG. 7.

In FIGS. 7 and 8 showing a second embodiment of the present invention, a coupling 21 comprises a tubular member 22 which is oval in cross section, a solid member 23 which is coaxially inserted in the tubular member 22 with a small clearance C therebetween, and two pairs of oppositely disposed impact absorbing members 24 of elastic material such as rubber, which are fixed to loosely curved opposite surfaces of the solid member 23 and longitudinally spaced apart along the central axis $C_1$ thereof. The term "loosely curved opposite surfaces" as herein used means a pair of curved surfaces which are symmetrical to each other with respect to the longer axis of the oval. Each of the impact absorbing members 24 has a certain length and width, and is compressed between the tubular member 22 and the solid member 23.

The coupling 21 functions in the same way as the coupling 1 as hereinabove described. Namely, transmission of torque between the tubular member 22 and the solid member 23 is carried out through the impact absorbing members 24 in the small torque range and by direct contact of the tubular member 22 and the solid member 23 in the large torque range. The impact absorbing members 24 may be replaced by a pair of impact absorbing members 24a which are opposite to each other with respect to a plane of symmetry 23b and equivalent in elasticity with the impact absorbing members 24. Further, if it is possible to maintain sufficient torsional rigidity against transmission of torque, the solid member 23 may be made hollow.

Figure 9:
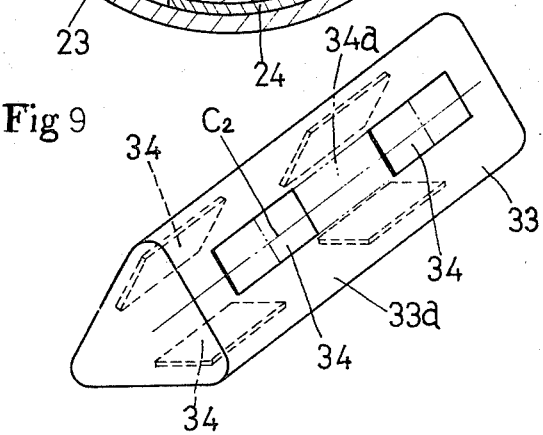
FIG. 9 is a perspective view showing a third embodiment of the coupling of the present invention.
Figure 10:
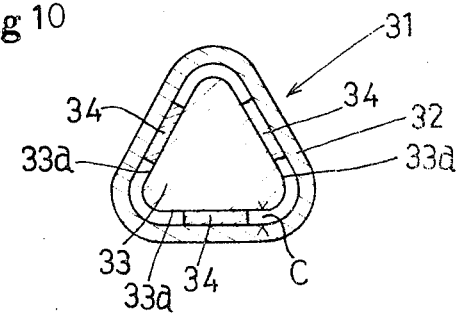
FIG. 10 is a cross sectional view of the coupling of FIG. 9.

In FIGS. 9 and 10 showing the third embodiment of the present invention, a coupling 31 comprises a tubular member 32, the cross section of which is an equilateral triangle having arcuate vertices, a solid member 33 shaped similarly to and inserted in the tubular member 32 with a small clearance C therebetween and three pairs of impact absorbing members 34 of elastic material such as rubber, which are fixed on three plane surfaces 33a of the solid member 33. Each of the pairs of the impact absorbing members 34 are longitudinally spaced apart along the central axis $C_2$ of the solid member 33, and are smaller in width than the plane surfaces 33a. The impact absorbing members 34 may be replaced by three impact absorbing members 34a.

The coupling 31 functions in the same way as the couplings 1 and 21 as hereinabove described.

While the invention has been described with reference to a few preferred embodiments thereof, it is to be understood that modifications or variations may be easily made without departing from the scope of this invention which is defined by the appended claims.

What is claimed is:

1. A coupling interposed between a driving shaft and a driven shaft for transmitting torque from said driving shaft to said driven shaft, said coupling comprising:
   a tubular member having an inner peripheral surface, a pair of longitudinally symmetrical, outwardly curved, accuate portions and a pair of longitudinally parallel plane portions;
   a solid member including a pair of longitudinally parallel plane portions and being received in said tubular member and having an outer peripheral surface spaced apart from said inner peripheral surface of said tubular member; and
   a plurality of impact absorbing members made of elastic material and fixed to said outer peripheral surface of said solid member, said impact absorbing members being so dimensioned and positioned as to prevent contact of said inner peripheral surface of said tubular member and said outer peripheral surface of said solid member when relative torque working therebetween is under a certain level and permit contact of said inner peripheral surface of said tubular member and said outer peripheral surface of said solid member when said torque is at or over said level.

2. The invention as defined in claim 1 wherein at least one pair of impact absorbing members defining said impact absorbing members are placed oppositely to each other on said outer peripheral surface of said solid member, a half of said impact absorbing members being secured to one of said plane portions and the remaining half thereof to the other of said plane portions.

3. The invention as defined in claim 1 wherein said solid member is provided in each of said plane portions with at least one rectangular concavity in which one of said impact absorbing members is received.

4. The invention as defined in claim 3 wherein said impact absorbing members are rectangular in shape.

5. A coupling interposed between a driving shaft and a driven shaft for transmitting torque from said driving shaft to said driven shaft, said coupling comprising:
   a tubular member having an inner peripheral surface and which is oval in cross-section;
   a solid member received in said tubular member and having an outer peripheral surface spaced apart from said inner peripheral surface of said tubular member; and
   a plurality of impact absorbing members made of elastic material and fixed to said outer peripheral surface of said solid member, said impact absorbing members being so dimensioned and positioned as to prevent contact of said inner peripheral surface of said tubular member and said outer peripheral surface of said solid member when relative torque working therebetween is under a certain level and permit contact of said inner peripheral surface of said tubular member and said outer peripheral surface of said solid member when said torque is at or over said level.

6. The invention as defined in claim 5 wherein at least one pair of impact absorbing members defining said impact absorbing members are placed oppositely to each other on loosely curved opposite surfaces of said solid member.

7. The invention as defined in claim 6, wherein said impact absorbing members are rectangular in shape.

* * * * *